United States Patent [19]

Peniston et al.

[11] 4,066,735
[45] Jan. 3, 1978

[54] PROCESS FOR DEMINERALIZATION OF CRUSTACEA SHELLS

[76] Inventors: Quintin P. Peniston, Rte. 7, Box 7710, Bainbridge Island, Wash. 98110; Edwin Lee Johnson, Rte. 5, Box 4246, Issaquah, Wash. 98027

[21] Appl. No.: 742,130

[22] Filed: Nov. 15, 1976

Related U.S. Application Data

[63] Continuation of Ser. No. 443,741, Feb. 19, 1974, abandoned.

[51] Int. Cl.$^2$ ............................................. C01F 11/46
[52] U.S. Cl. ................................... 423/159; 423/166; 423/173; 536/20
[58] Field of Search .................. 536/20; 423/173, 512, 423/519, 539, 542, 555, 242, 244, 636, 637, 638, 159, 166

[56] References Cited

U.S. PATENT DOCUMENTS

| 1,694,231 | 12/1928 | Richter | 423/173 |
|---|---|---|---|
| 1,959,448 | 5/1934 | Staufer et al. | 423/128 |
| 2,113,198 | 4/1938 | Nonhebel et al. | 423/242 |
| 2,676,090 | 4/1954 | Johnstone | 423/242 |
| 2,862,789 | 12/1958 | Burgess | 423/541 A |
| 3,025,131 | 3/1962 | Lerner | 423/173 |
| 3,533,940 | 10/1970 | Peniston et al. | 536/20 |
| 3,556,722 | 1/1971 | Owaki | 423/555 |
| 3,681,020 | 8/1972 | Shah | 423/541 |

*Primary Examiner*—O. R. Vertiz
*Assistant Examiner*—Wayne A. Langel
*Attorney, Agent, or Firm*—Rines and Rines, Shapiro and Shapiro

[57] ABSTRACT

This disclosure is concerned with the demineralization of crustacea shells and the like, before or after protein removal therefrom, with sulfurous acid, thus to convert the calcium carbonate of the shell to calcium bisulfite solution which may be separated from the solid residual shell, and regenerating sulfurous acid from the said solution for reuse in the process.

6 Claims, 1 Drawing Figure

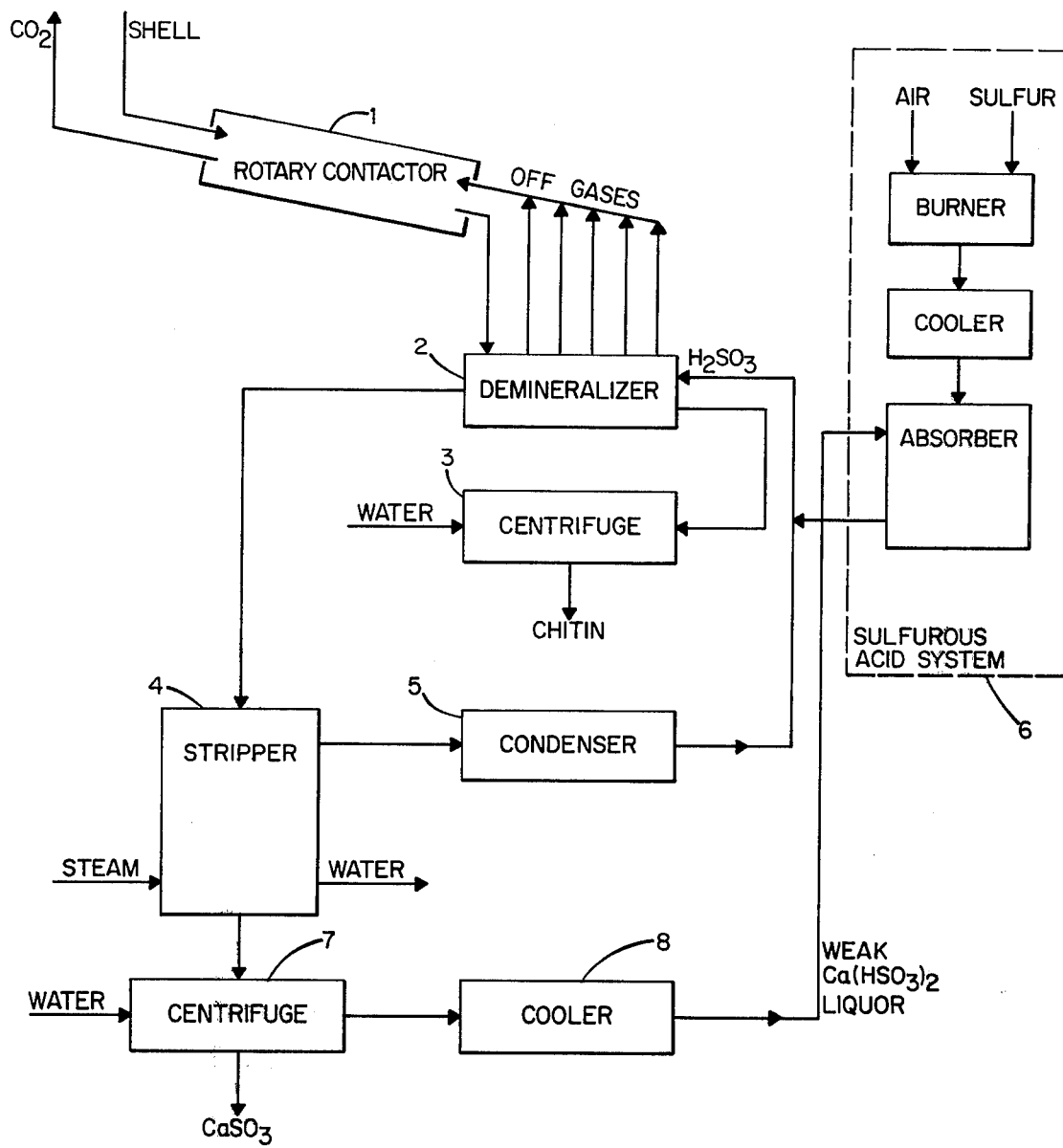

PROCESS FOR DEMINERALIZATION OF CRUSTACEA SHELLS

This is a continuation application of Ser. No. 443,741, filed Feb. 19, 1974, now abandoned.

The present invention relates to processes for demineralizing crustacea shells and the like which are rich sources of chitin, a polymeric carbohydrate material containing 2-deoxy-2-acetyl-amino glucose as its building unit. Many uses have been found for products derived from chitin, such as chitosan or deacetylated chitin, as described in, for example, our U.S. Letters Pat. No. 3,533,940. Recovery of chitin from shells of crustacea species is desirable in many locations throughout the world where shrimp, prawns, lobsters, crab, crayfish, etc. are harvested.

One of the difficulties in processing crustacea shells to recover chitin, is the removal of the large amounts of mineral matter, primarily calcium carbonate, which also are present in the shell. Generally, dilute hydrochloric acid is used for this purpose since it reacts rapidly with the calcium carbonate (and calcium phosphate), and the products, calcium chloride and calcium acid phosphate, are soluble and are readily removed. Hydrochloric acid, however, is relatively expensive and where markets do not exist for the reaction products, it becomes a major item in the cost of chitin manufacture. Hydrochloric acid, furthermore, is a hazardous and costly commodity to transport and store, adding considerably to its cost in remote localities. There is some evidence, moreover, that hydrchloric acid may be too strong an acid, and causes some degradation of the chitin during the demineralization treatment, as described by C. V. Lusena and R. C. Rose, *Journal of Fish. Research Bd. of Canada*, 10:521 (1953).

For the above reasons, in some applications, it is desirable to find a practical alternative to hydrochloric acid for demineralization of crustacea shells. Sulfuric acid, while cheaper and less corrosive than hydrochloric acid, is unsatisfactory since the reaction product, calcium sulfate, is insoluble and precipitates in the interstices and on the surface of shell particles. Acetic acid, while obtainable from chitin as a by-product in the manufacture of chitosan, is too weak to dissolve carbonates from the shell at a practical rate, and its regeneration for reuse from calcium acetate solutions would be a costly procedure. Sulfurous acid, moreover, though weaker than hydrochloric acid, is still much stronger than acetic acid; but calcium sulfite is even less soluble than calcium sulfate, so that if used in the ratio of one mol sulfurous acid to one mol of calcium carbonate, an insoluble precipitate is formed and demineralization is not accomplished.

In accordance with a discovery underlying the present invention, however, it has been found that by employing sulfurous acid in excess, calcium bisulfite is the reaction product, and this proves to be soluble, permitting removal of calcium carbonate from the shells.

Without recovery and reuse of sulfurous acid, however, there would be little or no economic advantages, since two mols of sulfurous acid are required to dissolve one mol of calcium as calcium bisulfite. An excess of "free" sulfurous acid, furthermore, must be present to prevent calcium sulfite precipitation.

In summary, with the present invention, ways have been found in which the reuse of sulfurous acid can be accomplished. One way to regenerate sulfurous acid from the calcium bisulfite solution is to add sulfuric acid in amount equivalent to the calcium present, causing precipitation of calcium sulfate. This can be separated by filtration and discarded while the sulfurous acid is recycled to the demineralization process. Another way to recover the sulfurous acid, in accordance with the invention, is to strip the excess sulfur dioxide from the calcium bisulfite solution with steam, reabsorbing it in water for reuse. The calcium bisulfite will convert to calcium sulfite under these conditions, thus liberating half of the sulfurous acid from the calcium bisulfite.

Precipitated calcium sulfite may be treated with sulfuric acid to recover sulfur dioxide at higher concentration for makeup purposes. Alternatively, the calcium sulfite precipitate may be heated in the absence of air to above 650° C. It then partially decomposes yielding lime and sulfur dioxide. In this way the calcium carbonate in the shell is converted to quicklime, a marketable product, consuming only the small amount of sulfur needed to make up for process losses. The technology for these treatments is well established and their use may or may not be employed, as desired, in the shell demineralization process.

In the reaction of calcium carbonate with acids, carbon dioxide is liberated. With acids of relatively low vapor pressure, such as dilute hydrochloric acid, carbon dioxide removal presents only slight difficulty since foaming is readily controlled. When sulfurous acid is used in excess, however, as in accordance with the present invention, both sulfur dioxide and carbon dioxide are evolved; and effective separation and recovery of the sulfur dioxide is necessary for both economic and environmental reasons.

The invention embraces, thus, means of conducting the demineralization process in a manner such that the crustacea shell itself assists in the separation and recovery of the sulfur dioxide.

It is thus an object of the invention to provide a new and improved process for the demineralization of crustacea shells and the like, void of the problems attendant upon the use of hydrochloric acid and the like, and embodying the use of sulfurous acid.

Other and further objects are explained hereinafter and are more particularly delineated in the appended claims.

The invention will now be described with reference to the accompanying drawing, illustrating a process flow chart of a preferred embodiment.

Moist deproteinized shell from a continuous centrifugal washer is fed to a rotary drum gas contactor 1 and passes counter-current to the stream of off-gases from an auger type continuous demineralizer 2. Contact is provided by wall flights lifting the shell and dropping it through the gas stream. A small portion of the calcium carbonate in the shell is converted to calcium sulfite and, since the ratio of shell to off-gases is large and the gas velocity is low, substantially complete sulfur dioxide absorption is assured. In the demineralizer 2, the shell is continuously treated with a sulfurous acid solution. Calcium carbonate and calcium sulfite formed in the rotary contactor are dissolved as calcium bisulfite. The chitin from the demineralizer 2 is washed and dewatered in a continuous centrifuge 3 and is subsequently converted, as is well known, to chitosan, or is otherwise recovered, as desired. The calcium bisulfite — sulfurous acid solution from the demineralizer 2 and the centrifugate from 3 are passed to an indirect vacuum stripper 4. Sulfur dioxide and water vapor from 4 are condensed in the condenser 5 and the resulting regenerated sulfurous acid solution is combined with fresh sulfurous acid solution from a conventional sulfur burning and adsorption system 6. The slurry of precipitated calcium sulfite and weak calcium bisulfite liquor is pumped from the stripper 4 to a continuous centrifugal decanter washer 7. The calcium sulfite may be treated by one of the means previously described to recover sulfur dioxide, or may be marketed as a by-product, or may be discarded. The centrifugate liquor containing some residual calcium bisulfite may be cooled at 8 and used to absorb sulfur dioxide from the sulfur burner at 6 for regenerative re-use. Excess, roughly equal to the water used to wash chitin and calcium sulfite in 3 and 7, may be discarded without substantial loss.

Advantages of the process of the invention for demineralization of crustacea shells include the following:

1. Sulfurous acid causes less degradation of the chitin in shell than does hydrochloric acid under comparable conditions, producing a superior product for many applications.

2. Sulfur compared to hydrochloric acid is an inexpensive, stable, non-corrosive, non-toxic material readily transported to and storable at any world location where processing of crustacea shells may be desirable. Its conversion to sulfurous acid is a well developed and relatively simple technology.

3. Possible by-products of the process, calcium sulfite, calcium sulfate, or lime are generally marketable commodities; or, lacking markets, do not present difficulties in disposal.

4. Demineralization of crustacea shells with hydrochloric acid represents a major portion of the cost of the chitin recovery process. This can be substantially reduced by the use of sulfurous acid.

Actual experiments with the process have been successfully conducted, as illustrated by the following examples.

EXAMPLE I

Shells of Dungeness crab (Cancer magister) were extracted with dilute sodium hydroxide solution to dissolve and remove protein. The residual deproteinized shell was washed and ground to an average particle diameter of 0.08 to 0.04 inches and dried in an air oven at about 80° C. (The particle size is a factor in determining rate of demineralization but is not critical in the process. Drying was for convenience only in this example and would normally be omitted in the process.) The dried, deproteinized shell showed the following composition by analysis:

Moisture, 0.8 percent
Chitin, (6.9 × %N), 29.5 percent
Calcium carbonate, 65.2 percent Fifty grams of the above material was suspended in one liter of sulfurous acid solution containing 62.5 grams of sulfur dioxide. The molar ratio of sulfur dioxide to calcium in the original mixture was 3.00 or 50 percent in excess of that required to form calcium bisulfite. The mixture was held in a flask stoppered with a water trap tube at 20° C for 2 hours using intermittent agitation. At the end of the period the solution contained 54.4 grams of total sulfur dioxide or 87 percent of that originally present. The chitin was collected on a filter, washed and analyzed for residual calcium carbonate. It contained 0.81 grams or 2.5 percent of that originally present in the deproteinized shell. Demineralization was thus 97.5 percent complete and sulfur dioxide evolved with carbon dioxide through the trap tube was 13 percent of that originally present or 39 percent of the excess employed.

EXAMPLE 2

Fifty grams of the same deproteinized shell as used in Example 1 was treated with 750 milliliters of sulfurous acid solution containing 69.3 grams of sulfur dioxide per liter added in small increments over a 40 minute period. The flask was again closed with a trap tube. Excess sulfur dioxide was 25 percent over that required for formation of calcium bisulfite. The temperature was 4° to 5° C. The mixture was allowed to stand with intermittent agitation for an additional 80 minutes and the solution was then removed from the residual shell. It contained 65.5 grams of sulfur dioxide per liter or 94.6 percent of the original sulfur dioxide. The chitin was removed on a filter, washed and dried yielding 16.0 grams. It was found to contain 32.7 percent calcium carbonate equivalent to 84 percent calcium removal. The chitin was deacetylated by heating with 50 percent sodium hydroxide solution at 140° C for 2 hours. After washing, the resulting chitosan was completely soluble in dilute acetic acid to yield a very viscous solution (700 cp at 2 percent concentration) which was colorless and did not have the bitter taste characteristic of chitosan prepared from chitin demineralized with hydrochloric acid.

A portion of the calcium bisulfite solution containing excess sulfur dioxide remaining after the demineralization treatment was boiled in an open beaker (i.e. effectively steam stripping) until only a faint odor of sulfur dioxide remained. The crystalline precipitate of calcium sulfite dihydrate was collected on a filter, dried and weighed. It amounted to 75 percent of the calcium in the original shell or 90 percent of the extracted calcium. The residual liquor still contained 10 grams of combined sulfur dioxide per liter equivalent to 15 percent of that originally used.

Further modifications will occur to those skilled in this art and such are considered to fall within the spirit and scope of the invention as defined in the appended claims.

What is claimed is:

1. In a process for the production of chitin from crustacea shell containing calcium carbonate, the method of demineralizing said shell, comprising treating the shell with sulfurous acid in amount in excess of that required, on a molar basis, to convert the calcium carbonate of the shell to a solution of calcium bisulfite and sufficient to prevent calcium sulfite precipitation, separating the chitin in said shell from said solution, regenerating sulfurous acid from the calcium bisulfite solution and reusing the regenerated sulfurous acid to demineralize additional shell in the process.

2. A process as claimed in claim 1 and in which the regenerating of sulfurous acid is effected by steamstripping the solution of calcium bisulfite to convert calcium bisulfite to calcium sulfite and to evolve sulfur dioxide, reabsorbing evolved sulfur dioxide in water and recovering the calcium sulfite.

3. A process as claimed in claim 2 and in which the further step is performed of decomposing the calcium sulfite by heat, recovering quick lime as a by-product and sulfur dioxide for reuse in the process.

4. A process as claimed in claim 2 and in which the calcium sulfite is converted to calcium sulfate by addition of sulfuric acid, thereby evolving sulfur dioxide, and the evolved sulfur dioxide is recovered for reuse in the process.

5. A process as claimed in claim 1 in which the regenerating of sulfurous acid is effected by converting calcium bisulfite in the solution to calcium sulfate through addition of sulfuric acid to the calcium bisulfite solution and separating the calcium sulfate.

6. A process as claimed in claim 1 and in which the additional shell is contacted with off gases resulting from said treating so that part of the calcium carbonate in the additional shell is converted to calcium sulfite and so that sulfur dioxide in the off gases is thereby substantially completely absorbed and separated from carbon dioxide in the off gases.

* * * * *